(12) United States Patent
Zhamu et al.

(10) Patent No.: US 7,948,739 B2
(45) Date of Patent: May 24, 2011

(54) GRAPHITE-CARBON COMPOSITE ELECTRODE FOR SUPERCAPACITORS

(75) Inventors: Aruna Zhamu, Centerville, OH (US); Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 547 days.

(21) Appl. No.: 11/895,657

(22) Filed: Aug. 27, 2007

(65) Prior Publication Data

US 2009/0059474 A1 Mar. 5, 2009

(51) Int. Cl.
*H01G 9/00* (2006.01)

(52) U.S. Cl. ........ 361/523; 361/502; 361/509; 361/512; 361/516; 361/519

(58) Field of Classification Search .................. 361/502, 361/503–504, 508–512, 301.4, 523–529, 361/516–519
See application file for complete search history.

(56) References Cited

U.S. PATENT DOCUMENTS

| | | | |
|---|---|---|---|
| 2,798,878 A | 7/1957 | Hummers | |
| 4,806,290 A | 2/1989 | Hopper et al. | |
| 4,873,218 A | 10/1989 | Pekala | |
| 5,260,855 A | 11/1993 | Kaschmitter et al. | |
| 6,031,711 A | 2/2000 | Tennent et al. | |
| 6,094,788 A * | 8/2000 | Farahmandi et al. | 29/25.41 |
| 6,099,960 A | 8/2000 | Tennent et al. | |
| 6,205,016 B1 | 3/2001 | Niu | |
| 6,757,154 B2 | 6/2004 | Reynolds, III et al. | |
| 6,781,817 B2 * | 8/2004 | Andelman | 361/503 |
| 6,830,595 B2 | 12/2004 | Reynolds, III | |
| 7,206,189 B2 * | 4/2007 | Reynolds, III | 361/502 |

OTHER PUBLICATIONS

U.S. Appl. No. 11/499,861, filed Aug. 7, 2006, L. Song, et al.
K. H. An, et al., "Electrochemical Properties of High-Power Supercapacitors Using Single-Walled CNT Electrodes," Advanced Functional Materials, 11 (No. 5) (Oct. 2001) 387-392.
G. Z. Chen, "Carbon Nanotube and Polypyrrole Composites: Coating and Doping," Advanced Materials, 12 (No. 7) (2000) 522-526.
C. Zhou, et al., "Functionalized Single Wall CNTs Treated with Pyrrole for Electrochemical Supercapacitor Membranes," Chemistry of Materials, 17 (2005) 1997-2002.
K. Jurewicz, et al., "Supercapacitors from Nanotubes/Polypyrrole Composites," Chemical Physics Letters, 347 (Oct. 2001) 36-40.
J. E. Huang, et al., "Well-dispersed Single-walled CNT/Polyaniline Composite Films," Carbon, 41 (2003) 2731-2736.

* cited by examiner

*Primary Examiner* — Nguyen T Ha

(57) ABSTRACT

A composite composition for use in an electrode for electrochemical capacitors, comprising: (a) an electrochemically active material; and (b) exfoliated graphite flakes that are substantially interconnected to form a porous, conductive graphite network comprising pores, wherein at least a portion of the active material resides in a pore of the network. The composite composition is characterized by having liquid accessible pores which provide a surface area greater than about 200 $m^2/gm$, preferably greater than 500 $m^2/gm$, more preferably greater than 1000 $m^2/gm$, and most preferably greater than 1000 $m^2/gm$. Also disclosed is a capacitor that includes at least an electrode comprising such a composite composition. A supercapacitor featuring such a composite electrode exhibits an exceptionally high capacitance value and high electrical conductivity.

32 Claims, 6 Drawing Sheets

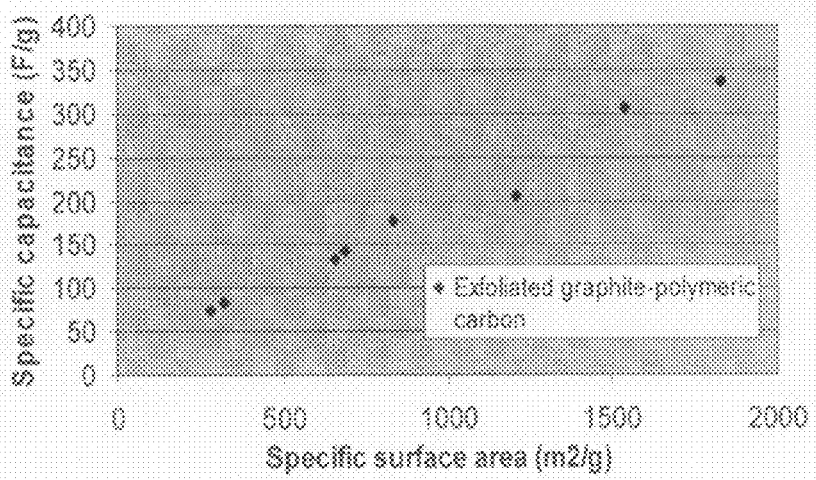

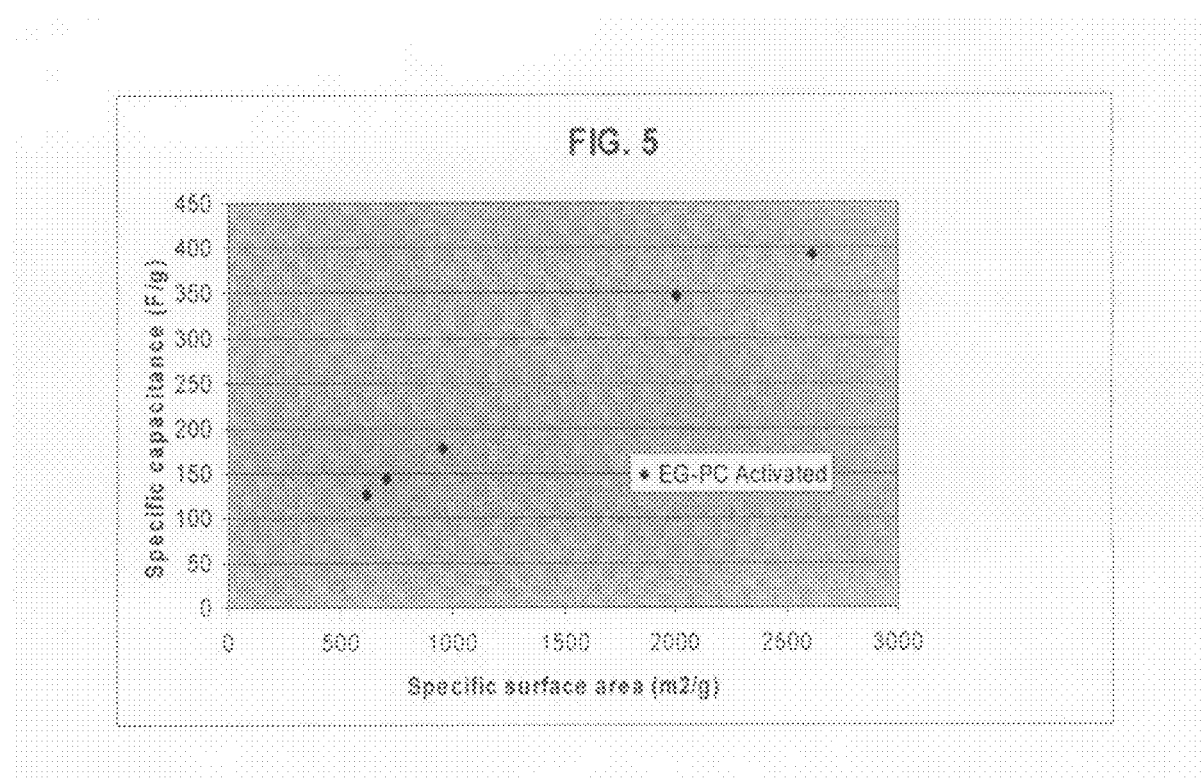

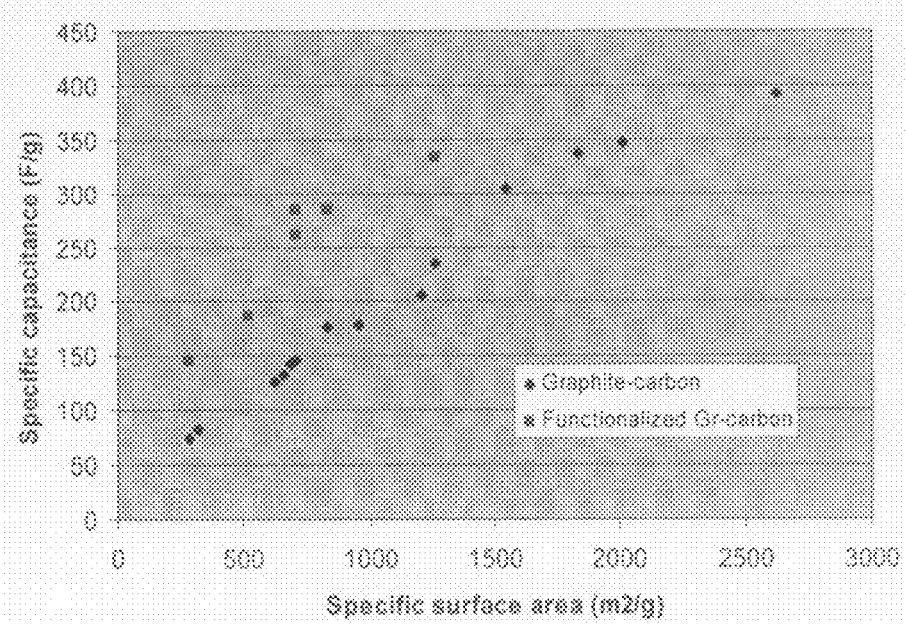

GRAPHITE-CARBON COMPOSITE ELECTRODE FOR SUPERCAPACITORS

This invention is based on the results of a research project sponsored by the U.S. Federal Government SBIR Program. The U.S. government has certain rights on this invention.

FIELD OF THE INVENTION

The present invention relates generally to the field of supercapacitor, ultracapacitor, or electrochemical capacitor, and more particularly to graphite-carbon composites and supercapacitor electrodes made of these composites.

BACKGROUND OF THE INVENTION

Electrochemical capacitors (ECs), also known as ultracapacitors or supercapacitors, are being considered for uses in hybrid electric vehicles (EVs) where they can supplement a battery used in an electric car to provide bursts of power needed for rapid acceleration, the biggest technical hurdle to making battery-powered cars commercially viable. A battery would still be used for cruising, but capacitors (with their ability to release energy much more quickly than batteries) would kick in whenever the car needs to accelerate for merging, passing, emergency maneuvers, and hill climbing. The EC must also store sufficient energy to provide an acceptable driving range. To be cost- and weight-effective compared to additional battery capacity they must combine adequate specific energy and specific power with long cycle life, and meet cost targets as well. Specifically, it must store about 400 Wh of energy, be able to deliver about 40 kW of power for about 10 seconds, and provide high cycle-life (>100,000 cycles).

ECs are also gaining acceptance in the electronics industry as system designers become familiar with their attributes and benefits. ECs were originally developed to provide large bursts of driving energy for orbital lasers. In complementary metal oxide semiconductor (CMOS) memory backup applications, for instance, a one-Farad EC having a volume of only one-half cubic inch can replace nickel-cadmium or lithium batteries and provide backup power for months. For a given applied voltage, the stored energy in an EC associated with a given charge is half that storable in a corresponding battery system for passage of the same charge. Nevertheless, ECs are extremely attractive power sources. Compared with batteries, they require no maintenance, offer much higher cycle-life, require a very simple charging circuit, experience no "memory effect," and are generally much safer. Physical rather than chemical energy storage is the key reason for their safe operation and extraordinarily high cycle-life. Perhaps most importantly, capacitors offer higher power density than batteries.

The high volumetric capacitance density of an EC (10 to 100 times greater than that of a conventional capacitor) derives from using porous electrodes to create a large effective "plate area" and from storing energy in the diffuse double layer near the "plate area." This electric double layer, created naturally at a solid-electrolyte interface when voltage is imposed, has a thickness of only about 1 nm, thus forming an extremely small effective "plate separation." In some ECs, stored energy is further augmented by pseudo-capacitance or Faradaic effects, occurring again at the solid-electrolyte interface due to electrochemical phenomena such as the redox charge transfer. The double layer capacitor is based on a high surface area electrode material, such as activated carbon, immersed in an electrolyte. A polarized double layer is formed at electrode-electrolyte interfaces providing high capacitance.

Experience with ECs based on activated carbon electrodes shows that the experimentally measured capacitance is always much lower than the geometrical capacitance calculated from the measured surface area and the width of the dipole layer. For very high surface area carbons, typically only about ten percent of the "theoretical" capacitance was observed. This disappointing performance was believed to be due to (a) the presence of micro-pores that are not accessible by the electrolyte, (b) wetting deficiencies, and/or (c) the inability of a double layer to form successfully in pores in which the oppositely charged surfaces are less than about 2 nm apart. In activated carbons, depending on the source of the carbon and the heat treatment temperature, a surprising amount of surface can be in the form of such micro-pores.

It would be desirable to produce an EC that exhibits greater geometrical capacitance using a carbon based electrode having a high accessible surface area, high porosity, and reduced or no micro-pores. It would be further advantageous to develop carbon- or graphite-based nano-structures that are conducive to the occurrence of pseudo-capacitance effects such as the redox charge transfer.

In this context, carbon nanotubes (CNTs) are of great interest. CNTs are nanometer-scale sized tube-shaped molecules having the structure of a graphite molecule rolled into a rube. A nanotube can be single-walled or multi-walled, dependent upon conditions of preparation. Carbon nanotubes typically are electrically conductive and mechanically strong and stiff along their length. Nanotubes typically also have a relatively high aspect ratio (length/diameter ratio). Due to these properties, the use of CNTs as reinforcements in composite materials for both structural and functional applications would be advantageous. In particular, CNTs are being studied for electrochemical supercapacitor electrodes due to their unique properties and structure, which include high surface area, high conductivity, and chemical stability. Capacitance values from 20 to 180 F/g have been reported, depending on CNT purity and electrolyte, as well as on specimen treatment such as $CO_2$ physical activation, KOH chemical activation, or exposure to nitric acid, fluorine, or ammonia plasma. Carbon nano-fibers (CNFs) and graphitic nano-fibers (GNFs), two thicker-diameter cousins of CNTs, have also been investigated as potential EC electrode materials.

Conducting polymers, such as polyacetylene, polypyrrole, polyaniline, polythiophene, and their derivatives, are also common electrode materials for supercapacitors. The modification of CNTs with conducting polymers is one way to increase the capacitance of the composite resulting from redox contribution of the conducting polymers. In the CNT/conducting polymer composite, CNTs are electron acceptors while the conducting polymer serves as an electron donor. A charge transfer complex is formed between CNTs in their ground state and aniline monomer. A number of studies on CNT/conducting polymer composites for electrochemical capacitor applications have been reported. The following references [Refs. 1-8] are related to CNT, CNF-, or GNF-based EC electrodes:

1. K. H. An, et al., "Electrochemical Properties of High-Power Supercapacitors Using Single-Walled CNT Electrodes," Advanced Functional Materials, 11 (No. 5) (October 2001) 387-392.
2. G. Z. Chen, "Carbon Nanotube and Polypyrrole Composites: Coating and Doping," Advanced Materials, 12 (No. 7) (2000) 522-526.

3. C. Zhou, et al., "Functionalized Single Wall CNTs Treated with Pyrrole for Electrochemical Supercapacitor Membranes," Chemistry of Materials, 17 (2005) 1997-2002.
4. K. Jurewicz, et al., "Supercapacitors from Nanotubes/Polypyrrole Composites," Chemical Physics Letters, 347 (October 2001) 36-40.
5. J. E. Huang, et al., "Well-dispersed Single-walled CNT/Polyaniline Composite Films," Carbon, 41 (2003) 2731-2736.
6. H. Tennent, et al., "Graphitic Nano-fibers in Electrochemical Capacitors," U.S. Pat. No. 6,031,711 (Feb. 29, 2000).
7. H. Tennent, et al., "High Surface Area Nanofibers, Methods of Making, Methods of Using and Products Containing Same," U.S. Pat. No. 6,099,960 (Aug. 8, 2000).
8. C. M. Niu, "Fibril Composite Electrode for Electrochemical Capacitors," U.S. Pat. No. 6,205,016 (Mar. 20, 2001).
9. R. A. Reynolds, III, "Method of Making Composite Electrode and Current Collectors," U.S. Pat. No. 6,830,595 (Dec. 14, 2004).
10. R. A. Reynolds, III, et al., "Double-Layer Capacitor Component and Method for Preparing Them," U.S. Pat. No. 6,757,154 (Jun. 29, 2004).
11. R. A. Reynolds, III, "Composite Electrode and Current Collectors and Processes for Making the Same," U.S. Pat. No. 7,206,189 (Apr. 17, 2007).

However, there are several drawbacks associated with carbon nano-tubes or nano-fibers for EC electrode applications. First, both nano-tubes and nano-fibers are extremely expensive. Second, both materials tend to form a tangled mess resembling a hairball, which is difficult to work with. These and other difficulties have limited efforts toward commercialization of supercapacitors containing nano-tube or nano-fiber based electrodes.

As a less expensive material, flexible graphite sheet has been used in an integrated electrode/current collector for EC applications, wherein the flexible graphite sheet is used as a substrate to support thereon or therein an electrode active material (e.g., activated carbon particles) [Refs. 9-11]. Actually, these carbon particles are embedded on the surface or into the bulk of a flexible graphite sheet. The "flexible graphite" is typically obtained by first treating natural graphite particles with an intercalating agent (intercalant) that penetrates into the inter-planar spacings of the graphite crystals to form a graphite intercalated compound (GIC). The GIC is then exposed to a thermal shock, up to a temperature of typically 800-1,100° C., to expand the intercalated particles by typically 80-300 times in the direction perpendicular to the graphene layers (basal planes) of a graphite crystal structure. The resulting expanded or exfoliated graphite particles are vermiform in appearance and are, therefore, commonly referred to as graphite worms. Hereinafter, the term "exfoliated graphite" will be used interchangeably with the term "expanded graphite." The worms may be re-compressed together into flexible sheets which can be formed and cut into various shapes. These thin sheets (foils or films) are commonly referred to as flexible graphite. Flexible graphite can be wound up on a drum to form a roll of thin film, just like a roll of thin plastic film or paper. The flexibility or compressibility of flexible graphite or exfoliated graphite enables the hard solid carbon particles to be embedded into the flexible graphite sheet when solid carbon particles and exfoliated graphite are combined and calendared, roll-pressed, or embossed together. However, such a combined electrode/current collector as disclosed in [Refs. 9-11] has several major shortcomings:

1) The exfoliated graphite or flexible graphite sheet cited in these patents is a passive material that is used solely as a substrate or binder material to hold the electrode active material together for forming an integral member (electrode/current collector). The flexible graphite or exfoliated graphite itself is not used as an electrode active material, i.e., it does not provide the diffuse double layer charges and, hence, does not contribute to the double layer capacitance.
2) In order for a flexible graphite sheet or exfoliated graphite particles to hold activated carbon particles together, the total amount of exfoliated graphite must be at least 50% by volume or more. Individual graphite particles are a solid, not a liquid adhesive. Although exfoliated graphite particles themselves can be re-compressed together to form a cohered body, the resulting flexible graphite sheet is normally very fragile. When a large amount of exfoliated graphite is used, the relative proportion of the electrode active material (the material that actually contributes to double layer capacitance) is small. Consequently, the effective energy density of the resulting supercapacitor is significantly curtailed.
3) By embedding activated carbon particles into a flexible graphite sheet or mixing activated carbon particles with exfoliated graphite particles, one tends to seal off the pores of activated carbon particles that have surface openings supposedly functioning to accommodate the liquid electrolyte. Mixing or embedding significantly reduces the amount of carbon particle pores that are designed to be accessible by liquid electrolyte, thereby reducing the effective electrolyte-electrode interface areas where double layer charges can be formed.
4) The activated carbon particles utilized by Reynolds, et al. [Refs. 9-11] were typically in the range of 600 μm and 900 μm. They were too big to penetrate the inter-layer spaces (<2.8 nm within an inter-planar spacing of 0.335 nm) between two graphene planes of unexpanded graphite crystallites. They were also too big to penetrate the space (typically <10 μm) between graphite flakes (each flake comprising a multiplicity of graphene sheets bonded by van der Waal's forces). With a maximum average expansion ratio of 300, the original inter-planar spacing of 0.335 nm would become at most 100 nm on average. In rare cases, there could be some pores as large as 10 μm, but these pores are still too small to accept activated solid carbon particles. In actuality, the activated carbon particles are simply squeezed by and held in place between clusters of expanded graphite flakes. Of course, such a configuration is advantageous in that it provides a substrate with good electrical conductivity and this substrate functions as a current collector as well.

It is therefore an object of the present invention to provide an exfoliated graphite-based supercapacitor electrode composition that has a high electrical conductivity and an ultra-high specific surface area.

It is another object of the present invention to provide an exfoliated graphite-based supercapacitor electrode composition that has an ultra-high double layer capacitance and high energy density.

Another object of the present invention is to provide a low-cost supercapacitor electrode composition which additional Faradaic or pseudo-capacitance can be readily imparted.

A further object of the present invention is to provide a supercapacitor electrode or integrated electrode/current collector that can be mass-produced from low-cost materials.

SUMMARY OF THE INVENTION

The present invention provides a composite composition for use in an electrode for electrochemical capacitors. The composite composition comprises (a) an electrochemically active material; and (b) exfoliated graphite flakes that are substantially interconnected to form a porous, conductive graphite network comprising pores, wherein at least a portion of the electrochemically active material resides in a pore of the network. One preferred example of the electrochemically active material is nano-scaled carbon particles converted from a carbonizable polymer residing in the inter-flake pores of graphite worms. These carbon particles are preferably further activated using techniques that are known in the art for the production of activated carbon.

Hence, in one preferred embodiment, the preparation of this composite composition may begin with the intercalation of natural graphite or any graphitic carbon material to form a graphite intercalation compound (GIC). The GIC is then exfoliated, typically by exposing the GIC to a thermal shock, to form graphite worms, which are aggregates of networks of interconnected graphite flakes. The worm has inter-flake pores that are typically 10 nm to 1 μm wide, with few being micron-sized. A solution or suspension containing a precursor active material is allowed to impregnate these inter-flake pores. For instance, the worms may be immersed in a phenolic resin, possibly diluted by an organic solvent to reduce the resin viscosity for facilitating impregnation. A dispersion agent or surfactant may be added to promote wetting of the internal pore walls by the precursor solution. Once the solvent is removed, the phenolic resin resides on the flake surfaces in the inter-flake pores. In another example, polyacrylonitrile (PAN) may be dissolved in a solvent and the worms are then immersed in the resulting solution. Once a sufficient time is allowed to ensure impregnation of the inter-flake pores by a solution or suspension, the solvent is removed, leaving behind a dried resin residing in the inter-flake interstitials (pores).

The precursor-impregnated worm may be optionally compressed to form a desired shape, e.g., a thin sheet. The resin-impregnated worms, prior to or after re-compression, are then subjected to pyrolization at a temperature typically in the range of 350° C. to 1,500° C. (preferably 500-1,000° C.). Such a treatment serves to convert the precursor material to an electrochemically active material, such as a polymeric carbon or amorphous carbon. Pyrolization or carbonization of a polymer, coal tar pitch, or petroleum pitch will also increase the specific surface area and electrical conductivity of the exfoliated graphite network. Optionally, the resulting carbon-impregnated worms are subjected to compression (if no compression was conducted prior to impregnation or carbonization) or further compression. In addition to a polymer or resin, the carbon-based active material may be derived from a petroleum pitch or its derivative, a coal tar pitch or its derivative, or a meso-phase pitch. Other types of electrode active materials, such as a transition metal oxide, carbide, or nitride, may be in a precursor organo-metallic form while being impregnated into the inter-flake pores. The precursor is then thermo-chemically decomposed into oxide, carbide, or nitride particles in situ (inside the inter-flake pores).

The graphite worm-carbon composite composition may be further subjected to an activation treatment, such as by $CO_2$. This will further increase the specific surface area of the exfoliated graphite-carbon composite. The activated composite may then be functionalized to impart thereto a Faradaic or pseudo-capacitance effect. Alternatively, the exfoliated graphite worms, with polymeric carbons residing in the inter-flake pores of the worms, may be functionalized without a prior activation. A wide range of surface functionalization routes may be taken. A particularly effective way is to incorporate a conjugate chain polymer, such as polypyrrole, polyaniline, or polythiophene, to the composite, with or without prior activation.

In addition to polymeric carbons (derived from polymers) and activated carbon (through activation of polymeric carbons), the electrochemically active material may be selected from the group consisting of carbon aerogels, carbon foams derived from polymers, oxides, hydrous oxides, carbides, nitrides, and combinations thereof. The oxides and hydrous oxides may be selected from the group consisting of $RuO_2$, $IrO_2$, $NiO$, $MnO_2$, $VO_x$, $PbO_2$ and $Ag_2O$. The carbides and nitrides may be selected from the group consisting of $MoC_x$, $Mo_2N$, $WC_x$, and $WN_x$.

The constituent exfoliated graphite flakes, which remain interconnected, preferably have a thickness in the range of approximately 0.34 nm to 10 nm, more preferably in the range of approximately 0.34 nm (single graphene sheet) to 2 nm (approximately 6 graphene layers per flake). In other words, it is most preferred that a majority or all of the inter-graphene spacings are expanded to at least several nanometers to permit penetration of a precursor active electrode material. These inter-graphene plane spacings are preferably compressed to become 2 nm-10 nm before or after the formation therein of active electrode particles.

In one of our earlier inventions [Lulu Song, A. Zhamu, Jiusheng Guo, and B. Z. Jang "Nano-scaled Graphene Plate Nanocomposites for Supercapacitor Electrodes" US Pat. Pending, Ser. No. 11/499,861 (Aug. 7, 2006)], we provided a meso-porous nanocomposite material, an electrode comprising such a nanocomposite material, and a supercapacitor comprising such an electrode. The nanocomposite comprises: (A) nano-scaled graphene platelets (NGPs) or separated (no longer interconnected) expanded graphite flakes (EGFs), wherein each of the platelets or flakes comprises a sheet of graphite plane or multiple sheets of graphite plane and the platelets or flakes have a thickness no greater than 100 nm (preferably smaller than 10 nm) and an average length, width, or diameter no greater than 10 μm (preferably smaller than 500 nm); and (B) a binder or matrix material attached or bonded to the platelets or flakes to form the nanocomposite material having liquid accessible pores characterized in that the nanocomposite material has a surface area greater than about 100 m$^2$/gm (preferably greater than 500 m$^2$/gm). In this commonly assigned patent application, the NGPs and EGFs were basically fully separated, isolated exfoliated graphite flakes. These flakes are no longer interconnected as in a graphite worm. Preferably, a binder material is used to help hold the NGPs together in an electrode.

By contrast, in the instant application, the exfoliated graphite worm is not subjected to a mechanical shearing treatment to separate the exfoliated graphite flakes. Instead, the exfoliated graphite flakes are allowed to remain interconnected to maintain a continuous network of electron-conducting paths and these flakes also form large amounts of inter-flake pores. Since the graphite flakes themselves are highly conductive, this network of interconnected graphite flakes (basically the original worm morphology being substantially maintained) is highly conducting with an electrical conductivity greater than $10^3$ S/cm. Once the flakes are broken apart, the re-aggregated or re-compressed configuration will have a much lower conductivity, often lower than $10^2$ S/cm. The electrode material should be as electrically conductive as possible to reduce the internal resistance.

BRIEF DESCRIPTION OF THE DRAWINGS

FIG. 4 The specific capacitance values of various graphite worm-carbon composite electrodes (without activation) plotted as a function of the specific surface area.

FIG. 5 The specific capacitance values of graphite worm-carbon composite electrodes (with activation) plotted over the specific surface area of the electrode.

FIG. 6 All the data points for the specific capacitance of various graphite worm-carbon composite electrodes (■=with pseudo-capacitance).

DESCRIPTION OF THE PREFERRED EMBODIMENTS

Figure 1:
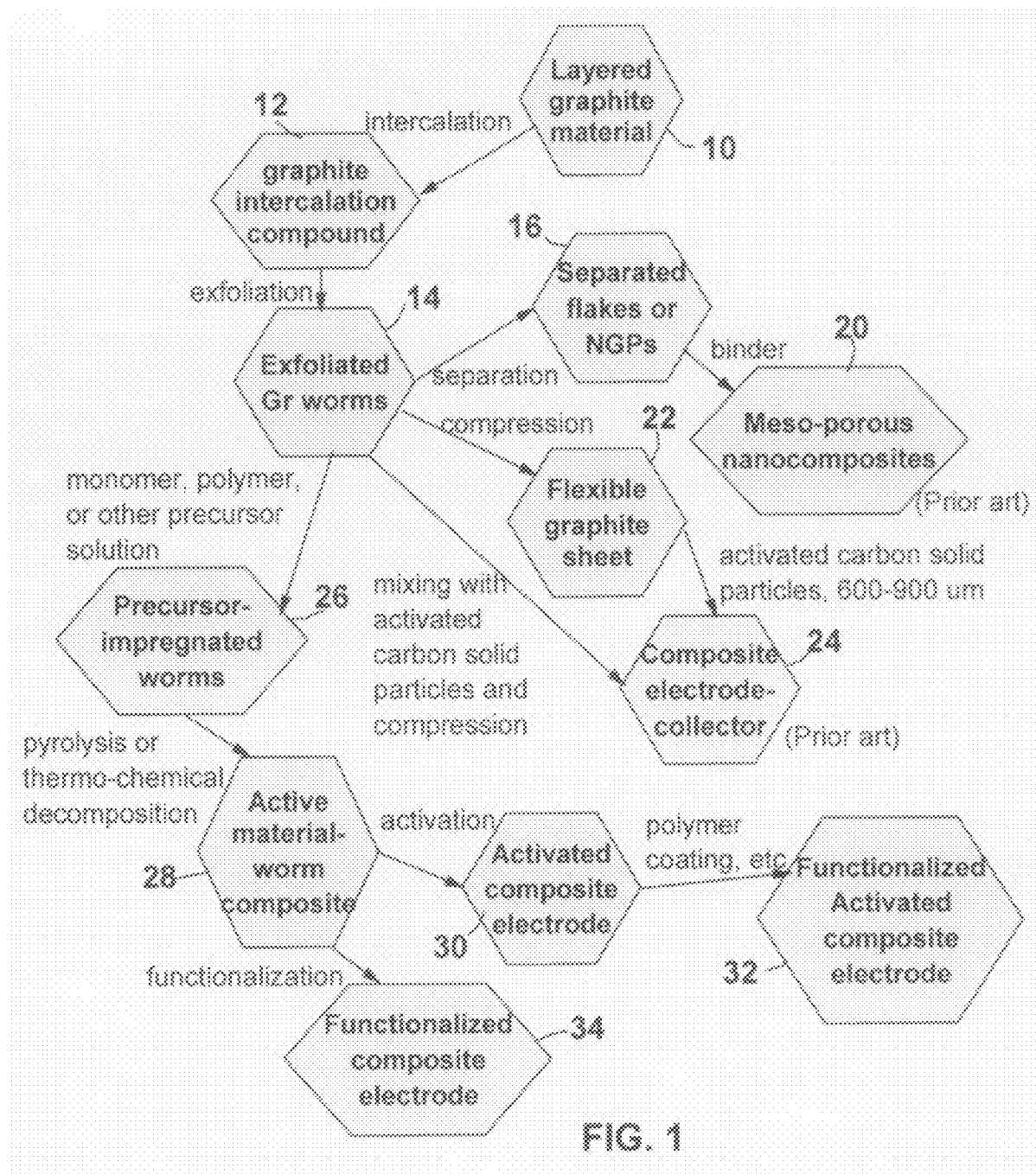
FIG. 1A flowchart showing several routes to the formation of graphite-carbon composite electrodes for supercapacitor applications.

When the electrochemical capacitor is operated on the basis of electric charges stored in an electric double layer produced at the interface between a polarized electrode material and the electrolyte, the energy W accumulated in the electric double layer at the time the electro-chemical capacitor is discharged at a constant current I from a voltage $V_i$ to a voltage $V_j$ may be expressed by the following equation:

$$W = \tfrac{1}{2} C(V_i^2 - V_j^2) = \tfrac{1}{2} C[(V_0 - IR)^2 - V_j^2] \quad (1)$$

This equation indicates that, in order to increase the energy density of the electrochemical capacitor, it is necessary to increase the capacitance C or the open-circuit voltage $V_0$, or to reduce the internal resistance R. The capacitance C increases in proportion to the effective interface area between the polarized electrode and the electrolyte, and is determined by a tolerable voltage that is governed by the reactivity between the polarized electrode and the electrolyte. One objective of the present invention was to significantly increase the effective interface area without compromising the tolerable voltage through the creation of large amounts of inter-flake pores in expanded graphite worms and meso-porous (non-microscopic) pores in or on polymeric carbons residing in the inter-flake pores. In one preferred embodiment of the present invention, polymeric carbons residing in the inter-flake pores are included as an additional electrode active material.

The internal resistance R includes the electric resistance of the electrode itself, and also a diffusion resistance for ions to move in the pores of the electrode and a diffusion resistance for ions to move in the electrolyte. The diffusion resistance for ions to move in the electrolyte is in inverse proportion to the ion conductivity of the electrolyte. Consequently, it is generally desired to have an electrolyte of high ion conductivity. The resistance of a conventional electrode is a combination of the resistances of both the electrode active material and the binder, matrix, or substrate material that is used to hold the active material, and how these two materials are combined together. A second major objective of the present invention was to significantly reduce the electrode resistance by forming a network of interconnected graphite flakes (unbroken or un-separated) to maintain a network of electron-conducting paths. In addition, and quite surprisingly, the surfaces of these graphite flakes (particularly when they are ultra-thin) provide exceptional amounts of electrolyte-electrode interface areas where electrical double layers can be readily formed.

The electrochemical capacitor or supercapacitor may also operate additionally on the Faradaic or pseudo-capacitance effect, for instance, via a fast redox reaction. A third objective of the present invention was to provide a composite electrode that can exhibit a high pseudo-capacitance through the presence of selective active nano-particles, such as transition metal oxides, carbides, or nitrides, or conductive polymer-carbon redox pairs, or through surface functionalization of the invented graphite-carbon composite electrode.

Carbon materials can assume an essentially amorphous structure (glassy carbon), a highly organized crystal (graphite crystal or crystallite), or a whole range of intermediate structures that are characterized by having various proportions and sizes of graphite crystallites and defects dispersed in an amorphous carbon matrix. Typically, a graphite crystallite is composed of a number of graphene sheets or basal planes (also referred to as a-b planes) that are bonded together through van der Waals forces in the c-axis direction, the direction perpendicular to the basal plane. Due to the multi-layer nature (multiple graphene sheets stacked together) of graphite crystallites, a graphite or graphitic carbon material is often referred to as a laminar or layered graphite material. These graphite crystallites are typically micron- or nanometer-sized in the a- or b-direction (these are called La dimension). The c-directional dimension (or thickness) is commonly referred to as Lc. The inter-planar spacing of a perfect graphite is known to be approximately 0.335 nm (3.35 Å). The graphite crystallites are dispersed in or connected by crystal defects or an amorphous phase in a graphite particle, which can be a graphite flake, carbon/graphite fiber segment, carbon/graphite whisker, or carbon/graphite nano-fiber. In the case of a carbon or graphite fiber segment, the graphene plates may be a part of a characteristic "turbostratic" structure. Natural graphite or synthetic graphite (such as highly oriented pyrolytic graphite) tends to have relatively large La and Lc dimensions. Any type of the aforementioned graphite particle can be used as a starting material for preparing the presently invented composite composition for use in a supercapacitor electrode.

For a laminar graphite material (such as a natural flake graphite, spheroidal graphite, synthetic graphite, highly oriented pyrolytic graphite, meso-carbon micro-bead, carbon/graphite fiber segment, carbon/graphite whisker, carbon/graphite nano-fiber, and carbon nano-tube), the distance between two graphene sheets (basal plane layers) is typically in the range of 0.335 nm-0.340 nm. By subtracting one graphene plane thickness from this inter-planar spacing, one obtains an interstitial space of smaller than 0.27 nm, which is too small to accommodate most of the electrolyte species. This implies that the inter-planar spaces cannot form an electrical double-layer and that only the exterior surfaces of laminar graphite particles are capable of forming electrical double layers if any of these laminar graphite materials is used as an electrochemical chemical (EC) capacitor electrode. Unfortunately, most of these laminar graphite particles (e.g., natural flake graphite, spheroidal graphite, synthetic graphite, highly oriented pyrolytic graphite, meso-carbon micro-bead, and carbon/graphite fiber segment) do not have very high specific surface area, typically lower than 100 m$^2$/g and mostly lower than 10 m$^2$/g. Carbon nano-tubes (CNTs) do possess a high specific surface area, but they are very expensive and high purity remains difficult to achieve.

After intensive research and development efforts, we have discovered a new class of graphite- or graphitic carbon-based material that has similarly good characteristics of a common laminar graphite material (e.g., high electrical conductivity and excellent chemical stability), yet has an inter-planar spacing that is typically several nanometers wide and can be wider than 10 nm. Hence, these inter-planar spacings (more accurately, inter-flake pore widths) are sufficiently large to be accessible by the electrolyte species. These graphite- or graphitic materials, like their parent laminar graphite, are also polarizable and capable of forming electrical double layers for supercapacitance. In addition, this class of material exhibits a high specific surface area, typically greater than 100 $m^2/g$, more typically greater than 500 $m^2/g$, in many cases, greater than 1,000 $m^2/g$, and some greater than 2,000 $m^2/g$.

As schematically shown in the process flow chart of FIG. 1, a laminar or layered graphite material 10 may be intercalated with an intercalant to form a graphite intercalation compound 12 (GIC). A GIC comprises intercalant species that have penetrated the inter-planar spaces and resided in these interstitial spaces. The intercalation process is well known in the art. As one example, a natural graphite sample may be immersed in a mixture of sulfuric acid, sodium nitrate, and potassium permanganate at 35° C. for one hour to obtain a GIC, which, upon washing and rinsing, becomes an expandable graphite.

The GIC or the expandable graphite may then be exposed to a high temperature, typically 800-1,100° C., for a short period of time, typically 15 seconds to 60 seconds. During this process, the GIC or expandable graphite undergoes a large expansion, typically by 80-300 times in the c-axis direction perpendicular to the graphene layers (basal planes) of a graphite crystal structure. The resulting expanded or exfoliated graphite particles are vermiform in appearance and are commonly referred to as graphite worms 14 (FIG. 1). Again, the term "exfoliated graphite" is used interchangeably with the term "expanded graphite." The worms 14 may be re-compressed together into flexible graphite sheets 22, often simply referred to as flexible graphite.

The exfoliated graphite may be subjected to a mechanical shearing treatment to separate the exfoliated flakes (by breaking up the network of interconnected flakes) for forming separated flakes or nano-scaled graphene platelets (NGPs) 16. The NGPs may be mixed with a binder material to obtain meso-porous nanocomposites 20, which are also good supercapacitor electrode materials, as disclosed earlier by two of us and colleagues [Lulu Song, A. Zhamu, Jiusheng Guo, and B. Z. Jang "Nano-scaled Graphene Plate Nanocomposites for Supercapacitor Electrodes" U.S. patent application Ser. No. 11/499,861 (Aug. 7, 2006)].

In another prior art approach [Refs. 9-11], the expanded graphite worms 14 may be compressed to become flexible graphite 22, which is then mixed with solid activated carbon particles (600-900 μm in size) to obtain composite electrode-collectors 24. Alternatively, the exfoliated graphite worms 14 may be mixed with solid activated carbon particles and then compressed to form composite electrode-collectors 24. This prior art approach has four major drawbacks as discussed earlier in the "Background of the Invention" section.

Figure 2:
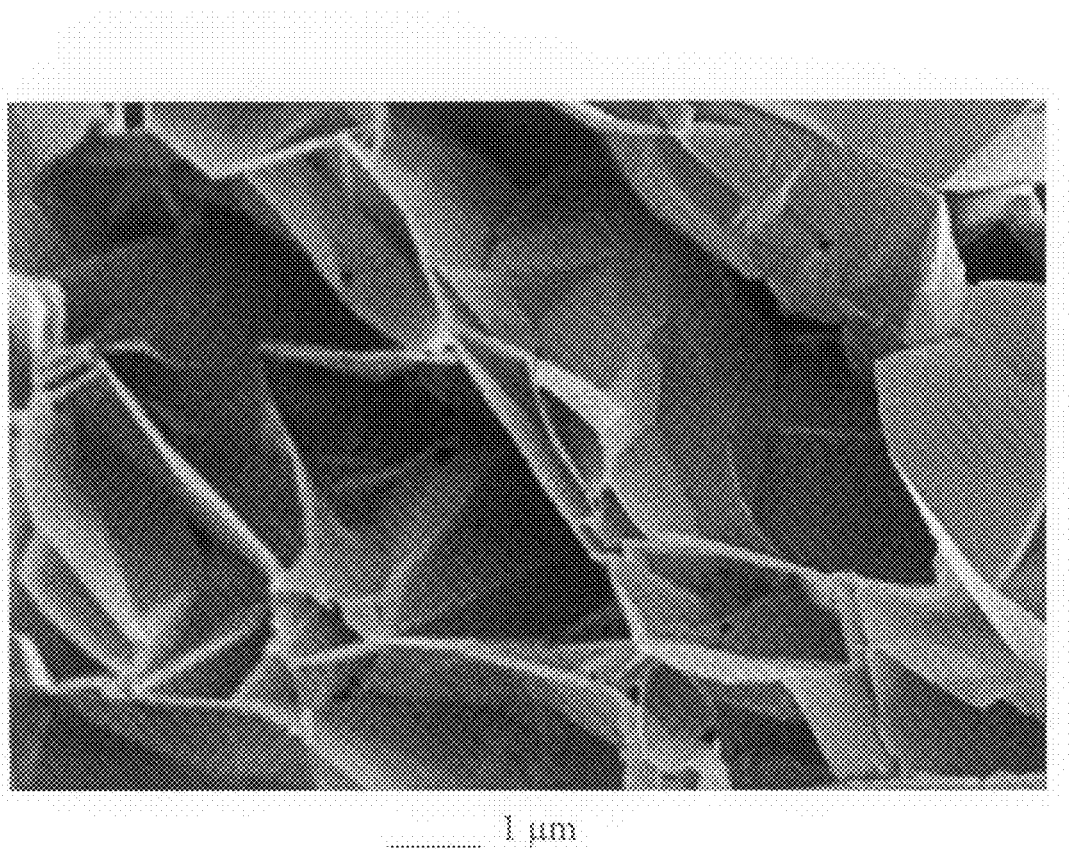
FIG. 2 Scanning electron micrographs of graphite worms, indicating that the exfoliated (expanded) graphite flakes are still interconnected, forming a network of electron-conducting paths which ensure good electrical conductivity or low internal resistance in an electrode. The flakes also support a large number of useful pores.

It is important to note that the graphite worms are typically characterized by having interconnected exfoliated flakes and inter-flake spaces, which are typically 10 nm-1 μm wide (rarely wider than 10 μm). These inter-flake spaces (e.g., as shown in SEM micrographs of FIG. 2) are pores that are accessible by electrolyte species and, hence, graphite worms are potential electrochemically active materials for EC electrodes. However, it appears that this possibility thus far has not been recognized. Further, the individual flakes of the worms obtained by prior art approaches are typically 10 nm to several hundred nanometers in thickness and 1-200 μm in length, width, or diameter. They are essentially multiple graphene sheets bonded together by van der Waal's forces with the inter-graphene spacing or distance remaining 0.335 nm. They are essentially un-expanded, un-exfoliated graphite crystallites with interstitial spaces of smaller than 0.27 nm. Clearly, these spaces are not accessible by commonly used non-aqueous electrolyte species in a supercapacitor. Hence, un-exfoliated graphite particles or those flakes with a thickness much greater than 10 nm are not very useful electrode active materials for supercapacitor applications. If the thickness is 100 nm, for instance, the specific surface area is only 14 $m^2/g$ In contrast, with a thickness of <10 nm and graphite density of 2.2 $g/cm^3$, the flake has a theoretical specific surface area of >100 $m^2/g$. Further, if the flake thickness is reduced to approximately 2 nm (composed of 6 graphene sheets), 1 nm (3 graphene sheets), 0.67 nm (2 graphene sheets), and 0.34 nm (single graphene sheet), respectively, then the theoretical specific surface area will be approximately 500, 1000, 1,450, and 2,765 $m^2/g$, respectively. It is of great significance to point out that these surface areas are readily accessible by the electrolyte, if the inter-flake pores are several nm or wider. With these considerations in mind, we proceeded to develop a new class of EC electrode active material based on impregnated graphite worms.

Referring to FIG. 1 again, the graphite worms 14 with good-sized inter-flake spaces (at least >2 nm, preferably greater than 10 nm) may be readily impregnated with one or more of a wide range of precursor materials to form precursor-impregnated worms 26. Examples of precursors are monomers or oligomers (convertible to polymers and then polymeric carbons), polymers or resins (precursors to polymeric carbons), and organo-metallic molecules (precursors to oxides, carbides, or nitrides).

Phenolic resin and epoxy resin are two good examples of a precursor material. The graphite worms 14 can be readily impregnated with a mixture of monomer reactants. Curing (polymerization and cross-linking) is then effected by heating the mixture at a temperature typically higher than 130° C. The cured resin normally resides on the interior walls of the inter-flake pores, which are actually the surfaces of individual flakes. This surface-bound resin normally has a smooth surface texture. The resulting precursor-impregnated worms 26 are then subjected to pyrolysis at a temperature typically in the range of 350-1,500° C., but more typically in the range of 500-1,000° C. The resulting material is a polymeric carbon-adhered worm 28, which is basically a composite of polymeric carbon residing in a network of thin flakes that are interconnected. The pyrolysis process serves to remove most of the non-carbon elements from the starting polymer, thereby forming a highly porous carbon structure. These new pores are formed due to the removal or evaporation of elements such as nitrogen, hydrogen, oxygen, and their molecules. The polymer loses typically between 30% and 70% of its original mass. These pores significantly increase the amount of useful surfaces in the composite. In other words, the total interfacial areas between an electrolyte phase and a carbon or graphite surface are significantly increased, thereby increasing the double layer capacitance. The presence of the porous polymeric carbon or nano-scaled carbon particles can also act to prevent the exfoliated flakes from touching one another, which could otherwise close up the inter-flake pores if the worms are compressed during the preparation of an electrode.

Similarly, a thermoplastic polymer, such as polyacrylonitrile, styrene DVB, and cellulosic polymers, may be dissolved in a solvent to form a solution. The exfoliated worms may be immersed in this solution for a length of time sufficient for impregnation of the solution into inter-flake pores. Upon removal of the solvent from the pores, the polymer precipitates out and resides on the interior walls of the inter-flake pores. The polymer-impregnated worms are then pyrolyzed to convert the polymer into a carbon material, which is a polymeric carbon with a large number of meso-pores. This carbonization treatment significantly increases the specific surface area of the impregnated worms, which are excellent EC electrode materials.

Hence, one preferred embodiment of the present invention is a composite composition for use in an electrode for electrochemical capacitors. The composition comprises: (a) an electrochemically active material; and (b) exfoliated graphite flakes that are substantially interconnected to form a porous, conductive graphite network comprising pores, wherein at least a portion of the active material resides in a pore of the flake network. Pyrolyzed polymers or polymeric carbons are good electrode active materials for incorporation into inter-flake pores of graphite worms. Since graphite is known to be a polarizable material, the flakes themselves are also considered as an electrode active material due to the notion that they form great amounts of electrolyte-electrode interface areas where electrical double layers of charges exist.

In addition to polymeric carbons (derived from polymers) and activated carbon (through activation of polymeric carbons), the electrochemically active material may also be selected from the group consisting of carbon aerogels, carbon foams derived from polymers, oxides, hydrous oxides, carbides, nitrides, and combinations thereof. U.S. Pat. Nos. 4,806,290 (Feb. 21, 1989 to Hopper, et al.), 4,873,218 (Oct. 10, 1989 to Pekala) and 4,997,804 (Mar. 5, 1991 to Pekala) illustrate the preparation of aerogels. The aerogel fluid, preferably prior to gelation, may be introduced into the inter-flake pores. The resulting gel is then carbonized. Carbon foams may be an aerogel, xerogel, or aerogel-xerogel hybrid. Carbon foams may be derived from the pyrolysis of mixtures of polyhydroxybenzene compounds that react in an appropriate ratio with formaldehyde and furfural resin. Useful mixtures include resorcinol/furfural, resorcinol/formaldehyde, phenol/resorcinol/formaldehyde, catechol/formaldehyde, and phloroglucinol/formaldehyde. Although carbon foams alone have been used as an electrode (e.g., as disclosed in U.S. Pat. No. 5,260,855, issued Nov. 9, 1993 to Kaschmitter, et al.), the achieved capacitance was several tens of F/g (in contrast to up to 395 F/g of the presently invented supercapacitor). Thus far, carbon foams have never been incorporated in graphite worms to form a composite electrode.

The oxides and hydrous oxides may be selected from the group consisting of $RuO_2$, $IrO_2$, $NiO$, $MnO_2$, $VO_x$, $PbO_2$ and $Ag_2O$. The carbides and nitrides may be selected from the group consisting of $MoC_x$, $Mo_2N$, $WC_x$, and $WN_x$. Several methods, well known in the art, can be used to produce metal oxides, carbides, or nitrides from a solution, including sono-chemical reduction, electrochemical deposition, thermo-chemical decomposition, sol-gel synthesis, and hydrothermal synthesis. These methods can be adapted to deposit or form metal oxide, carbide, or nitride nano particles inside the inter-flake pores or directly on the surfaces of the interconnected flakes in a graphite worm. For instance, a sono-chemical method can be used to incorporate $MnO_2$ nano-particles inside the inter-flake pores of graphite worms. Modification of the pore wall surfaces to make them hydrophilic enables $KMnO_4$ to readily penetrate the pore channels. At the same time, the modification changes the surface reactivity, enabling the formation of $MnO_2$ nano-particles inside the pores by the sono-chemical reduction of metal ions.

$NiO_x$ thin film coating on the inter-flake pore walls can be prepared by electrochemical precipitation of $Ni(OH)_2$ films from $Ni(NO_3)_2$ solution, followed by heat-treatment. The surface morphology of the $NiO_x$ films can be changed from dense to porous morphology with an increase in the deposition rate of $Ni(OH)_2$ films. Vanadium pentoxide nano-particles can be grown by electrochemical deposition, surface condensation induced by a pH change, and sol electrophoretic deposition. Thermo-chemical reduction of organo-metallic molecules or metal-containing solution can also be effected to produce other oxide nano-particles inside the inter-flake pores. For instance, $V_2O_5$ powder can be dissolved into a mixed solution of benzyl alcohol and iso-butanol to obtain a vanadium solution, which is then impregnated into inter-flake pores to form a precursor-impregnated worm composite. The composite is then subjected to a heat treatment at temperatures above 300° C., preferably at 400° C. The resulting structure is either crystalline $V_2O_5$ thin film or fine particles residing inside the inter-flake pores. An organic-tungsten compound can be thermally decomposed to form tungsten oxide films. Specifically, a toluene solution of hexaphenoxy-tungsten can be impregnated into the inter-flake pores. Upon removal of toluene, the impregnated material is heat-treated at 200-400° C. in air or an oxygen-containing environment to obtain the desired composite.

The process used to prepare the composite electrode depends on the active material incorporated into the inter-flake pores. The composite electrodes may be prepared by the sol-gel method wherein the sol-gel fluid is used to impregnate the pores. Where the active material to be combined with the interconnected flake network is an oxide, a hydrous oxide, a carbide, or a nitride, the process includes the steps of dissolving the active material in water, dispersing the worms in water (without breaking the flakes), adding the active material solution to the worm dispersion, adsorbing or precipitating the active material in the pores of worms after dispersion, and filtering and washing the dispersion until an active material/worm composite is obtained. Where the electrochemically active material is an oxide, a further step of adjusting the pH of the active material/worm dispersion prior to filtration may be required.

The produced active material-graphite worm composite 28 may be subjected to an activation treatment to produce activated composite electrode 30 with a further increased level of porosity. This approach is particularly relevant to composites containing polymeric carbon films or particles deposited on the surfaces of exfoliated flakes (in the inter-flake pores). Activation of carbons is well known in the art and there is no theoretical reason why any particular activation method cannot be selected for activating the polymeric carbons inside the inter-flake pores. Activation may be accomplished by physical activation (e.g., with steam or carbon dioxide) and chemical activation (e.g., with phosphoric acid, zinc chloride, aluminum chloride, KOH and NaOH). NaOH can develop very high value of porosity and KOH can develop samples with narrower pore size distribution. The activation treatment can also be accomplished through exposure to nitric acid, fluorine, or ammonia plasma.

In one preferred embodiment of the present invention, the activated composite or composite electrode 30 is functionalized so that one or more of a wide range of functional groups can be imparted to the surfaces of the exfoliated graphite flakes and/or the activated carbons residing in the inter-flake pores. The resulting product is a functionalized, activated composite or composite electrode 32. Alternatively, the active material-worm composite 28 (without activation) may be functionalized to become a functionalized composite electrode 34.

The term "functional group" refers to groups of atoms that give the compound or substance to which they are linked desirable chemical and physical properties. A "functionalized" surface refers to a carbon or graphite surface on which chemical groups are adsorbed or chemically attached so as to be available for electron transfer with the carbon/graphite and for interactions with ions in the electrolyte. Functional groups typically used in the instant invention include, but are not limited to, those selected from the group consisting of —$SO_3$, —R'COX, —R'(COOH)$_2$, —CN, —R'CH$_2$X, =O, —R'CHO, —R'CN, where R' is a hydrocarbon radical and X is —$NH_2$, —OH or a halogen. Preferably, the active material-worm composite 28 or the activated composite electrode 30 is functionalized, for example with one or more functional groups selected from quinone, hydroquinone, quaternized aromatic amines, mercaptans or disulfides. The functional groups may be contained in a ladder polymer of the formula:

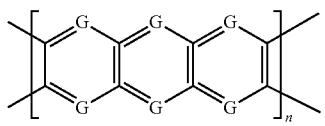

wherein G is CH or N, or may be a graphenic analogue of one or more of

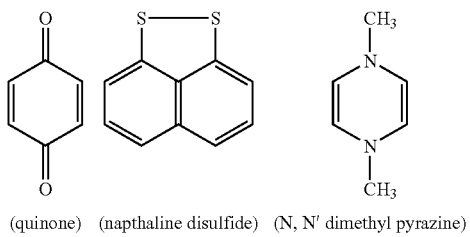

(quinone)  (napthaline disulfide)  (N, N' dimethyl pyrazine)

The word "graphenic" carbon is a form of carbon whose carbon atoms are each linked to three other carbon atoms in an essentially planar layer forming hexagonal fused rings. The layers are platelets only a few rings in diameter or they may be ribbons, many rings long but only a few rings wide. There is no order in the relation between layers, few of which are parallel.

The specific capacitance of a polymeric carbon-graphite worm composite can be increased in two ways: (1) by increasing the effective surface area through activation to increase the electrical double layer capacitance; and (2) by functionalizing the surfaces with high concentrations of redox groups, particularly those groups with strongly oxidizing or reducing potential, to achieve an enhanced Faradaic or pseudo-capacitance effect. Ideally, unlike a conventional battery, the redox reactions at or near the surface of the electrodes do not involve a phase change. In a conventional battery, a conversion from one oxidation state to another proceeds typically at a singular potential until virtually all of one phase is converted to another. For examples, pseudo-capacitance of an oxidized graphite worm-based electrode may be achieved via the quinone/hydroquinone couple, or the electrode may contain quaternized aromatic amines, or the mercaptan-disulfide couple:

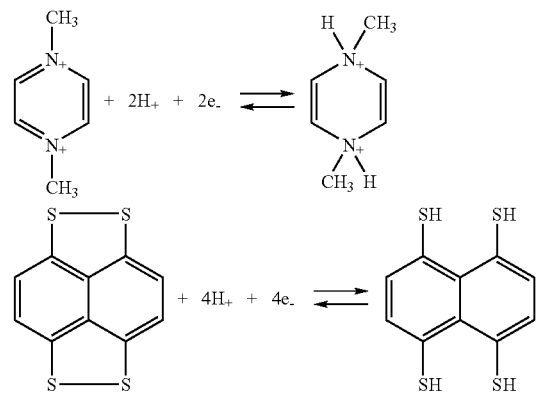

Another class of surface functional groups is a conjugate-chain conducting polymer. A conducting polymer provides an opportunity for added pseudo-capacitance due to the redox effect intrinsic to the conducting polymer or between the conducting polymer and the exfoliated graphite flake or polymeric carbon. Polyaniline, polypyrrole, polythiophene, and their soluble precursor polymers are good choices for use in the present invention. Again, these treatments are intended for further increasing the capacitance value through pseudo-capacitance effects such as redox reactions.

It is of significance to discuss in more detail the selection of precursors to polymeric carbons. By carbon precursor is meant a synthetic polymeric carbon-containing substance that converts to carbon on heating. A carbon precursor is used because as a result of curing, carbonizing and activating, the carbon particles, in combination with the underlying flake surfaces, are arranged in a continuous uninterrupted structure of three-dimensional graphitic platelets or particles. A high-yielding carbon precursor is preferred because greater than about 40% of the cured resin is converted to carbon on pyrolization (e.g., at 350° C. to 1,500° C.). For purposes of this invention, an especially useful high-yielding carbon precursor is a synthetic polymeric carbon precursor, e.g. a synthetic resin in the form of a solution or low viscosity liquid at ambient temperatures or capable of being liquefied by heating or other means. Synthetic polymeric carbon precursors include any liquid or liquefiable carbonaceous substances. Examples of useful carbon precursors include thermosetting resins, some thermoplastic resins, petroleum pitch, coal tar pitch, meso-phase pitch, etc.

Low viscosity carbon precursors (e.g., thermosetting resins) are preferred for impregnating applications because their low viscosity allows greater penetration into the pores. Typical resin viscosity ranges from about 50 to 100 cps. Any high carbon yield resin can be used. Phenolic and furan resins are quite suitable. Phenolic resins are most preferred due to their low viscosity, high carbon yield, high degree of cross-linking upon curing relative to other precursors, and low cost. Suitable phenolic resins are resole resin such as 43250 polyophen resin, and 43290 from Occidental Chemical Corporation, and Durite resole resin from Borden Chemical Company. One especially suitable furan liquid resin is Furcab-LP from QO Chemicals Inc. The carbon precursor can include a single high carbon-yielding precursor material, or a mixture of two or more such precursor materials. To obtain carbon of desired porosity, a catalyst metal and/or low carbon-yielding carbon precursor may be included with the high-carbon-yielding carbon precursor.

It may be advantageous to combine a carbon precursor and a pore former. At least a portion of the pore former dissolves molecularly in the carbon precursor. Preferably, the pore former has a decomposition or volatilization temperature above the curing temperature and below the carbonization temperature of the carbon precursor. The carbon precursor is cured, carbonized, and optionally activated, and at the same time the pore former is removed. By pore former is meant any organic compounds or mixtures that volatilize or decompose at the temperature range above the curing temperature and below the carbonization temperature of the carbon-forming precursor. For example, this temperature range is between 150° C. and 750° C. for a typical phenolic resole resin of viscosity around 50 to 100 cps. Pore formers having a decomposition temperature of about 150° C. to 500° C. are useful, and with about 250° C. to 400° C. being especially suitable. The pore former can either completely decompose or volatilize in the desired temperature range (preferred) or leave traces of residue after carbonization.

It is preferred that the pore-formers be thermoplastic materials. Some especially useful pore formers are thermoplastic polymeric materials, such as polyvinylbutyrals (PVB) of various molecular weights, e.g. 40,000 to 250,000, polyethylene glycols (PEG) of various molecular weights, e.g. about 600 to 10,000, and heavy petroleum fractions and/or coal liquids (e.g., petroleum or coal tar pitch) of various molecular weights. In some special cases, pore formers can be bulky organometallic compounds. Some examples are organo-rare earth metal complexes, such as $X(C_5H_5)_3$ (cyclopentadienyl), and X(acac) (acetylacetonate), where X represents Sm, Y, Yb, and Lu, and transition metal complexes such as Y(acac), where Y represents Fe, Co and Ni. The functions of organometallic compounds are two fold, one being a pore former through decomposition of the hydrocarbon fragments from the metal complexes, the second being catalytic generation of pores from the metals.

In other special cases, the pore former can be a portion of selected carbon precursors. Typically, these would be long chain aliphatic branches of the carbon precursor molecules, so that during curing, a looser frame structure is produced, and the aliphatic long chain branches decompose and leaving pores in the carbon matrix. Some examples are butylated phenolic resins under the name of P97 produced by Borden, and styrenated phenolic resin under the name of LV3020 also produced by Borden chemical.

The various types of the pore forming materials can be used together, providing that they are mutually compatible in their chemical nature, and they at least partially form a true solution with the carbon precursor. The compatibility is especially important for making impregnated worms, where it is desirable that essentially all, that is, >99% of the pore-former forms a true solution, in other words, dissolves molecularly in the carbon precursor. The desired amounts of pore former have to be dissolved into the liquid carbon precursor to produce a mixture of suitable viscosity for dip-coating. For shaping graphite worms, the pore formers and carbon precursor are first dissolved into a suitable common solvent for uniform pore former distribution. The solvent is then removed, leaving the pore formers dissolved in the carbon precursor.

The thermoplastic resins (as a carbon precursor) that can be impregnated into the inter-flake pores of a graphite worm include polyacrylonitrile (PAN). The solvent used for polyacrylonitrile is preferably selected from the group consisting of propylene carbonate, tetramethylene sulfone (sulfolane), gamma-butyrolactone, and mixtures thereof, such as propylene carbonate and tetramethylene sulfone, propylene carbonate and gamma-butyrolactone, or propylene carbonate, tetramethylene sulfone, and gamma-butyrolactone.

The impregnated composite, containing a thermoplastic, a thermosetting resin, coal tar pitch, petroleum pitch, mesophase pitch, or a combination thereof, is then pyrolized to become carbon-graphite composite. The removal of non-carbon elements from the polymer generates a large number of pores that are by and large interconnected to allow for accessability of liquid electrolyte. This pyrolization procedure could significantly increase the surface area from typically 100-200 $m^2$/gm to above 300 $m^2$/gm (typically 500-1,500 $m^2$/gm), a highly desirable result. Again, the meso-porous carbon-graphite worm composite may be subjected to an activation treatment (analogous to activation of carbon black materials) to create additional surfaces (with a specific surface area greater than 2,500 $m^2$/gm) and possibly imparting functional chemical groups to these surfaces. The activation treatment can be accomplished through $CO_2$ physical activation, KOH chemical activation, or exposure to nitric acid, fluorine, or ammonia plasma.

Figure 3:
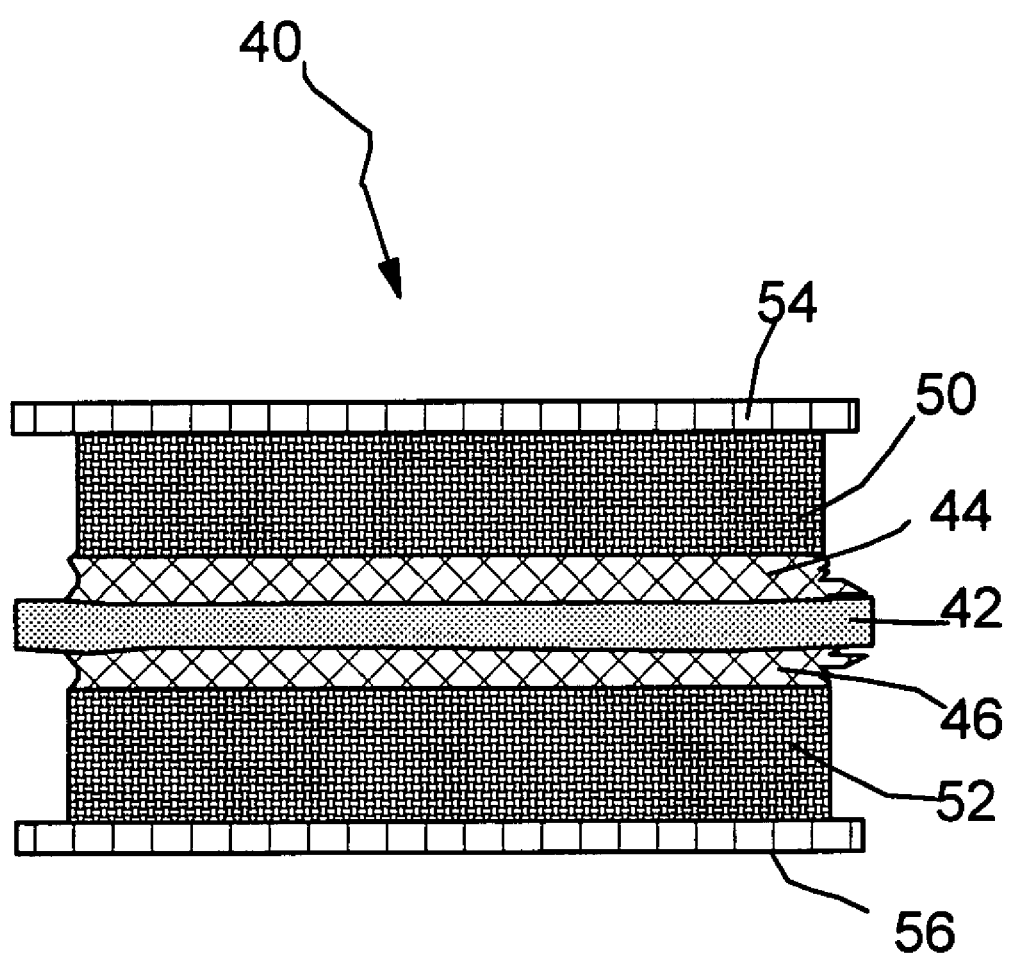
FIG. 3 Schematic of a single-cell supercapacitor.

A test device, schematically shown in FIG. 3, was assembled to resemble a capacitor. In most cases, the test devices had two identical graphite-carbon composite electrodes 50,52 (typically, 12.5 mm diameter and approximately 0.11 mm thick), separated by a 0.025 mm thick polymer separator 42 using 38 wt % $H_2SO_4$ as the electrolyte 44,46. Occasionally, 4 M KOH was used as the electrolyte. A conducting rubber was used as the current collectors 54,56 in the present study although other conductive materials may be used as well. In the present invention, the graphite-carbon composite electrode itself can also serve as a current collector. It may be further noted that the two electrodes of a unit cell do not have to be of identical compositions. The presently invented composite electrode can be used in either or both electrodes. The equivalent series resistance (E.S.R.) was measured at 1 kHz at 0 V bias. Capacitance was measured by a constant current charging method. The composite electrodes were wetted easily by the sulfuric acid electrolyte. The capacitance generally reached a stable state after the second charging. A number of different composite electrodes were prepared in accordance with the procedures outlined in the Examples provided below. For each composite electrode prepared in the Examples, the electrode thickness, the electrode density (g/cm$^3$), the equivalent series resistance of a test capacitor (E.S.R.), the specific capacitance of the electrode ($C_P$) and the device capacitance ($C_D$) based on the wet weight of electrodes were measured. Under the $C_P$ column (specific capacitance of the electrode), 5 mA was the constant charge current used for the test.

The following examples serve to illustrate the preferred embodiments of the present invention and should not be construed as limiting the scope of the invention:

EXAMPLE 1

Hydrogen Peroxide-Assisted, Formic Acid-Intercalated Graphite and Exfoliated Graphite from Highly Oriented Pyrolytic Graphite (HOPG) Flakes One hundred grams of HOPG flakes of approximately 20 μm in size, were immersed in a mixture of 50 L of formic acid and 2.5 L of hydrogen peroxide at 45° C. for 24 hours. Following the chemical oxidation intercalation treatment, the resulting intercalated flakes were washed with water and dried. The resulting product is a formic acid-intercalated graphite compound.

Subsequently, the intercalated compound was transferred to a furnace pre-set at a temperature of 800° C. for 30 seconds. The compound was found to induce extremely rapid and high expansions of graphite crystallites with an expansion ratio of greater than 200. The thickness of exfoliated graphite flakes of the resulting worms (Sample 1-A) ranged from two graphene sheets to approximately 26 graphene sheets (average of 12 sheets or approximately 4.0 nm) based on SEM and TEM observations. Sample 1-A exhibits a specific surface area of 220 $m^2/g$ as measured by the BET method.

Approximately one half of the graphite worms were then subjected to re-intercalation under comparable chemical oxidation conditions to obtain re-intercalated graphite worms. Subsequently, these re-intercalated worms were transferred to a furnace pre-set at a temperature of 800° C. for 30 seconds to produce re-exfoliated worms composed of ultra-thin flakes (Sample 1-B). Electron microscopic examinations of selected samples indicate that the majority of the resulting flakes contain between single graphene sheet and five sheets. Hence, there was an enormous amount of inter-flake pores, as evidenced by the high BET surface area of 1,020 $m^2/g$.

Both Sample 1-A and Sample 1-B were separately impregnated with a precursor resin mixture in the following manner. Ferric nitrate was used as the catalyst metal. About 7 g of ferric nitrate was added to a small amount of water. After ferric nitrate was completely dissolved, the solution was mixed into about 1,000 ml of phenolic resole resin and stirred vigorously to ensure homogeneous dispersion of the catalyst precursor. The metal containing mixture was then used to impregnate the graphite worms, and then dried at about 95° C. The samples were slightly compressed to form a flat sheet of re-compressed, resin-impregnated worms, which were then cured at about 150° C., and carbonized at about 750° C. for about 1 hr in $N_2$ to produce Samples 1-A-pc and 1-B-pc, respectively. Approximately ⅓ of Samples 1-A-pc and 1-B-pc separately were activated at about 700° C. for a period of 2 hours in steam and nitrogen mixture to obtain two activated composite samples, 1-A-pc-act and 1-B-pc-act, respectively.

The resulting samples of activated carbon-worm composites and their un-activated counterparts were analyzed using $N_2$ adsorption isotherm for pore size distribution. The resulting activated carbon-worm composites are mainly meso-porous, the meso-porous content being 80-90% of the total porosity. The graphite-carbon composites have about 10% of micro-pores and macro-pores. The majority of pores in the meso-pore range are around 30 to 60 angstroms (85% of meso-pores) with a peak at 38 angstroms (3.8 nm). The surface area of the meso-porous graphite-carbon composites are: 320 $m^2/g$ (1-A-pc), 620 $m^2/g$ (1-A-pc-act), 1,540 $m^2/g$ (1-B-pc), and 2,010 $m^2/g$ (1-B-pc-act), respectively.

EXAMPLE 2

Sulfuric-Nitric Acid-Intercalated Natural Flake Graphite

Ten grams of natural flake graphite, provided by Asbury Carbons (405 Old Main St., Asbury, N.J. 08802, USA), were intercalated with a mixture of sulfuric acid, nitric acid, and potassium permanganate at a weight ratio of 4:1:0.05 (graphite-to-intercalate ratio of 1:3) for 48 hours. Upon completion of the intercalation reaction, the mixture was poured into deionized water and filtered. The sample was then washed with 5% HCl solution to remove most of the sulfate ions and residual salt and then repeatedly rinsed with deionized water until the pH of the filtrate was approximately 5. The dried sample was then exfoliated at 1,050° C. for 45 seconds. The resulting worms were examined using SEM and TEM and the thickness of constituent flakes was in the range of 0.34 nm and 1.36 nm (but, mostly single- or double-layer flakes). The specific surface area is approximately 1,520 $m^2/g$.

The worms were subjected to the same impregnation, carbonization, and activation treatments to obtain Sample 2-pc (no activation) and Sample 2-pc-act (with activation), respectively. The surface areas of the meso-porous graphite-carbon composites are 1,830 $m^2/g$ (Sample 2-pc) and 2,620 $m^2/g$ (Sample 2-pc-act), respectively.

EXAMPLE 3

Repeated Interaction and Exfoliation of Meso-Carbon Micro-Beads (MCMBs)

MCMB 2528 microbeads were supplied by Alumina Trading, which is the U.S. distributor for the supplier, Osaka Gas Company of Japan. This material has a density of about 2.24 $g/cm^3$; a particle size maximum for at least 95% by weight of the particles of 37 microns; median size of about 22.5 microns and an inter-planar distance of about 0.336 nm. MCMBs were treated with a mixture of sulfuric acid, sodium nitrate, and potassium permanganate according to the method of Hummers [U.S. Pat. No. 2,798,878, Jul. 9, 1957]. Upon completion of the reaction, the mixture was poured into deionized water and filtered. The sample was then washed with 5% HCl solution to remove most of the sulfate ions and residual salt and then repeatedly rinsed with deionized water until the pH of the filtrate was approximately 7. The intent was to remove all sulfuric and nitric acid residue out of graphite interstices. The slurry was spray-dried and stored in a vacuum oven at 60° C. for 24 hours. The dried compound was placed in a quartz tube and inserted into a horizontal tube furnace pre-set at 1,050° C. for 35 seconds. The exfoliated worms exhibited inter-flake spaces of 20-80 nm wide and an average flake thickness of 1.8 nm. The specific surface area was approximately 520 $m^2/g$.

Approximately ½ of the worms were subjected to the same impregnation, carbonization, and activation treatments as described in Example 1 to obtain Sample 3-pc (no activation) and Sample 3-pc-act (with activation). The specific surface areas of the meso-porous graphite-carbon composites are 830 $m^2/g$ (Sample 3-pc) and 1,260 $m^2/g$ (Sample 3-pc-act), respectively.

Approximately ¼ of the worms were impregnated with $RuO_2\text{-}xH_2O$ using a sol-gel method. Approximately 15 mg of $RuCl_3\text{-}xH_2O$ (Aldrich, used as received) was dissolved in 10 cc water. Separately, 50 mg of graphite worms were dispersed into 100 cc water. The solution of $RuCl_3\text{-}xH_2O$ was added drop by drop to the worm dispersion as it was slightly stirred. A 0.1 M NaOH solution was added to the $RuCl_3\text{-}xH_2O$/worm dispersion until pH of 7 was achieved. The dispersion was filtered and washed until a mat-like structure with the diameter of 1.5" was obtained (Sample 3-$RuO_2$). After heating at 170° C. in air for 12 hours, the mat was tested as an electrode for electrochemical capacitors.

For the preparation of Sample 3-pc-NiO, three mats with diameters of 0.5" made from Sample 3-pc were soaked in 2 M $Ni(NO_3)_2$ for 12 hours. After drying at 180° C., the mats were heated at 300° C. in air for 1 hour to convert impregnated $Ni(NO_3)_2$ to NiO. The weight gain was 13.5%, which suggested 13.5% NiO loading on the mats. Two mats were made into a test electrochemical capacitor using 4 M KOH as the electrolyte.

Polypyrrole (PPy) can be prepared by electrochemical polymerization with well-controlled growth rates and film thickness. For the preparation of Sample 3-pc-ppy, portion of Sample 3-PC was used as an anode electrode material. A pyrrole monomer solution was electrolyzed in the presence of $Et_4N^+BF_4^-$, until a blue-black conducting polymer was produced at the anode (mostly inside the inter-flake pores). The produced PPy was in the doped state.

For the preparation of Sample 3-pc-act-ppy, a portion of Sample 3-PC-act was used as an anode electrode material. A pyrrole monomer solution was electrolyzed in the presence of $Et_4N^+BF_4^-$, until a blue-black conducting polymer was produced at the anode (mostly inside the inter-flake pores). Again, the produced PPy, coated on the surfaces of both polymeric carbon particles and graphite flakes, was in the doped state.

In all of the EC testing samples, two electrodes with a diameter of 0.5" (1.25 cm) were prepared from the mat-like sheet. A single cell electrochemical capacitor was fabricated with these electrode separated by a 0.001" (0.025 mm) thick polymer separator using 38% $H_2SO_4$ as the electrolyte. The specific capacitance for the composite electrode was measured by a constant current charge method.

EXAMPLE 4

Citric Acid-Intercalated Short Graphite Fiber Segments

Graphite fibers (Amoco P-100 graphitized carbon fiber) chopped into segments with 0.2 mm or smaller in length were immersed in a mixture of citric acid and hydrogen peroxide at an acid-to-oxidizer ratio of 10:2 at 60° C. for 36 hours. The diameter of carbon fibers was approximately 12 μm. After intercalation and exfoliation at 600° C. for 30 seconds, the flakes exhibit an average thickness of 18 nm. Re-intercalation of these worms of intermediate-thickness flakes with a mixture of formic acid and hydrogen peroxide (rather than citric acid) and subsequent exfoliation of the dried re-intercalation compound resulted in the formation of worms with ultra-thin flakes having an average thickness of 1.7 nm. The specific surface area was approximately 560 $m^2/g$.

Polyacrylonitrile (PAN) is dissolved in a solvent (propylene carbonate) to obtain a 2% by weight PAN solution, which was used to impregnate the worms. Upon removal of the solvent, the resulting dried composite was subjected to oxidation at 250° C. for an hour and carbonized at about 750° C. for about 1 hr in $N_2$ to produce Samples 4-pc, which has a specific surface area approximately of 685 $m^2/g$. Approximately ⅓ of Samples 4-pc were activated at about 700° C. for a period of 2 hours in steam and nitrogen mixture to obtain activated composite Sample 4-pc-act, which has a specific surface area of approximately 955 $m^2/g$.

EXAMPLE 5

Graphite Worms from Acid Treated Carbon Nano-Fibers (CNFs)

A powder sample of carbon nano-fibers was supplied from Applied Science, Inc. (ASI), Cedarville, Ohio. Approximately 2 grams of CNFs were subjected to repeated intercalations and exfoliations as in Example 1. Worms of ultra-thin flakes with an average thickness of 1.8 nm were obtained. The specific surface area was approximately 485 $m^2/g$. Polymeric carbon was introduced into the inter-flake pores using the same process as in Example 4. The resulting Sample 5-pc has a specific surface area of approximately 655 $m^2/g$

EXAMPLE 6

Electrochemical Intercalation of Spheroidal Graphite

Five grams of spheroidal graphite (from Huadong Graphite Co., Pingdu, China) were used as the anode material and 5 L of formic acid was used as the electrolyte and intercalate source. The anode supporting element is a platinum plate and the cathode is a graphite plate of approximately 8 cm in diameter and 0.2 cm in thickness. The separator, a glass fiber fabric, was used to separate the cathode plate from the graphite flakes and to compress the graphite flakes down against the anode supporting element to ensure that the graphite flakes are in electrical connection with the anode supporting element to serve as the anode. The electrodes, electrolyte, and separator are contained in a Buchner-type funnel to form an electrochemical cell. The anode supporting element, the cathode, and the separator are porous to permit intercalate (electrolyte) to saturate the graphite and to pass through the cell from top to bottom.

The graphite spherules were subjected to an electrolytic oxidation treatment at a current of 2 amps (current density of about 0.04 amps/$cm^2$) and at a cell voltage of about 4-6 volts for 2-5 hours. These values may be varied with changes in cell configuration and makeup. Following electrolytic treatment, the resulting intercalated spherules were washed with water and dried.

Subsequently, approximately ⅔ of the intercalated compound was transferred to a furnace pre-set at a temperature of 600° C. for 30 seconds. The compound was found to induce extremely rapid and high expansions of graphite crystallites with an expansion ratio of greater than 200. The exfoliated graphite has an average flake thickness of approximately 7.9 nm based on SEM and TEM observations. This material (Sample 6-A) has a specific surface area of 103 $m^2/g$.

Approximately one half of these worms were then subjected to re-intercalation under comparable electrolytic oxidation conditions to obtain re-intercalated worms. Subsequently, these re-intercalated worms were transferred to a furnace pre-set at a temperature of 600° C. for 30 seconds to produce worms comprising ultra-thin flakes. Electron microscopic examinations of selected samples indicate that the majority of the resulting flakes contain between single graphene sheet and five sheets. The specific surface area was approximately 1,420 $m^2/g$.

Approximately one half of Sample 6-A was subjected to a polymeric carbon formation treatment through impregnation of a phenolic resin and subsequent pyrolization as described in Example 1. The resulting graphite-carbon composite (Sample 6-A-pc) has a specific surface area of 283 $m^2/g$. Approximately ⅓ of Samples 6-A-pc were activated at about 700° C. for a period of 2 hours in steam and nitrogen mixture to obtain an activated composite samples, 6-A-pc-act, which exhibits a specific surface area of 703 $m^2/g$.

Portions of Sample 6-A-pc and Sample 6-A-pc-act, both containing C—H groups, were sulfonated using fuming sulfuric acid (oleum), which is a solution of concentrated sulfuric acid containing up to 20% $SO_3$. The vapor phase reaction was carried out in a horizontal alumina tube reactor heated by a tube furnace. A multi-neck flask containing 20% $SO_3$ in concentrated $H_2SO_4$ fitted with gas inlet/outlet tubes was used as the $SO_3$ source. A weighed sample of both graphite worm-carbon composites in a porcelain boat was separately placed in the 1" tube fitted with a gas inlet; the outlet was connected to a concentrated $H_2SO_4$ bubbler trap. Argon was flushed through the reactor for 20 min to remove all air, and the sample was heated to 300° C. for 1 hour to remove residual moisture. After drying, the temperature was adjusted to the reaction temperature under an argon atmosphere. When the desired temperature was reached, the $SO_3$ source was connected to the reactor tube and an argon stream was used to carry $SO_3$ vapors into the alumina tube reactor. Reaction was carried out for the desired length of time at the desired temperature, after which the reactor was cooled under flowing argon. The composites were then dried at 90° C. at 125 mm Hg vacuum. Sulfonic acid (—$SO_3H$) content was determined by reaction with 0.010 N NaOH and back-titration with 0.010 N HCl using pH 6.0 as the end point. The functionalized materials are referred to as Sample 6-A-pc-$SO_3$ and Sample 6-A-pc-act-$SO_3$, respectively.

A portion of Sample 6-A-pc-act was impregnated with Poly(3-methyl-thiophene). Electronically conductive polymers by themselves are promising supercapacitor electrode materials because the charge process involves the entire polymer mass and they provide low equivalent series resistance for the electrode. When combined with a network of exfoliated graphite flakes, the conducting polymer can impart pseudo-capacitance to the electrode. One desirable conductive polymer selected was poly (3-methyl-thiophene) (pMeT), particularly its p-doped variant. Poly (3-methyl-thiophene) can be synthesized by oxidative chemical polymerization technique using ferric chloride as a dopant in an inert atmosphere. However, we chose to prepare PMeT doped with different anions electrochemically in the presence of tetra-alkyl-ammonium salts using a graphite worm mat as an electrode. The resulting material is referred to as Sample 6-A-pc-act-pMeT.

EXAMPLE 7

Graphite Worms-Carbon Foams

Natural graphite was treated with a procedure similar to that in Example 1. The resulting graphite worms exhibit a specific surface area of 210 $m^2/g$.

A resorcinol-formaldehyde-based (RF) gel was prepared. The reactants contain 12.35 g of resorcinol, 17.91 g of formaldehyde, 15.30 g of deionized water, and 5.58 g of sodium carbonate. The first three components were mixed in a beaker until a clear, homogeneous solution was formed. The sodium carbonate catalyst was then added. The solution was then used to impregnate graphite worms. The gel was then cured according to the following cycle: 24 hours at room temperature, followed by 24 hours at 50° C., and 72 hours at 95° C. The resulting Sample 7-RF exhibits a specific surface area of 1,210 $m^2/g$.

The results of capacitance measurements for the aforementioned samples are summarized in Table 1 and FIGS. 4-6.

TABLE 1

Properties and characteristics of graphite-carbon composite electrodes.

| Sample Code | Original graphite/ carbon material | Thickness (mm) | Specific surf. area, $m^2/g$ | ESR (Ohm) | Cp (F/g) |
|---|---|---|---|---|---|
| 1-A-pc | HOPG | 0.115 | 320 | 0.059 | 82 |
| 1-A-pc-act | HOPG | 0.12 | 620 | 0.062 | 126 |
| 1-B-pc | HOPG | 0.12 | 1540 | 0.057 | 305 |
| 1-B-pc-act | HOPG | 0.12 | 2010 | 0.063 | 346 |
| 2-pc | Natural graphite | 0.11 | 1830 | 0.072 | 336 |
| 2-pc-act | Natural graphite | 0.105 | 2620 | 0.075 | 392 |
| 3-pc | MCMB | 0.11 | 830 | 0.071 | 176 |
| 3-pc-act | MCMB | 0.11 | 1260 | 0.073 | 235 |
| 3-$RuO_2$ | MCMB | 0.115 | 520 | 0.089 | 186 |
| 3-pc-ppy | MCMB | 0.115 | 830 | 0.058 | 285 |
| 3-pc-act-ppy | MCMB | 0.12 | 1260 | 0.06 | 334 |
| 4-pc | Graphite fiber | 0.13 | 685 | 0.09 | 143 |
| 4-pc-act | Graphite fiber | 0.13 | 955 | 0.095 | 178 |
| 5-pc | CNF | 0.12 | 655 | 0.085 | 133 |
| 6-A-pc | Spheroidal graphite | 0.12 | 283 | 0.067 | 74 |
| 6-A-pc-act | Spheroidal graphite | 0.12 | 703 | 0.068 | 145 |
| 6-A-pc-$SO_3$ | Spheroidal graphite | 0.12 | 283 | 0.068 | 146 |
| 6-A-pc-act-$SO_3$ | Spheroidal graphite | 0.12 | 703 | 0.068 | 260 |
| 6-A-pc-act-pMeT | Spheroidal graphite | 0.125 | 703 | 0.066 | 285 |
| 7-RF | Natural graphite | 0.13 | 1210 | 0.071 | 205 |

Several observations are particularly noteworthy:
(1) The equivalent series resistance (ESR) of the presently invented graphite-carbon composite electrode system is between 0.058-0.09 ohms, lower than the ESR (approximately 0.1-0.8 ohm) of representative activated carbon or carbon black-based electrodes. This is likely due to the high electrical conductivity of graphite flakes that are interconnected.
(2) The specific capacitance of graphite worm-carbon composite electrodes (without activation) is plotted in FIG. 4. A best-fit straight line would indicate a slope of approximately 0.18 $F/m^2$ or 18 $\mu F/cm^2$, which is consistent with the well-known fact that carbon-based electrode shows a double layer capacitance in the range of 16-40 $\mu F/cm^2$ [Column 1, Ref. 6]. Specific capacitance values of various graphite worm-carbon composite electrodes (with activation) are plotted in FIG. 5. A best-fit straight line would indicate a slope of approximately 0.16 $F/m^2$ or 16 $\mu F/cm^2$, which is again consistent with the double layer capacitance of activated carbons.
(3) Both FIG. 4 and FIG. 5 indicate that the double-layer capacitance increases linearly with the specific surface area up to very high values (up to 2,620 $m^2/g$). This implies that the presently invented composite materials and processes provide a very consistent and reproducible method of achieving an ultra-high capacitance by simply increasing the surface areas. A majority of surface areas appear to be useful areas, i.e., accessible by the electrolyte and capable of forming double layer charges.
(4) The presently invented graphite-carbon composite electrodes deliver exceptionally high specific capacitance values, 74-392 F/g. These are far better than the well-known capacitance values of from 20 to 180 F/g for CNT-based supercapacitor electrodes. Yet, the graphite-carbon composites are very inexpensive, likely 1 or 2 orders of magnitude less expensive than CNT materials.
(5) The data shown in FIG. 6 indicate that electrochemically active materials, such as oxides and conducting polymers, and surface functional groups can impart a high level of pseudo-capacitance to an already relatively high capacitance of the presently invented graphite-carbon composite electrodes.

In conclusion, we have successfully developed a new and novel class of meso-porous graphite-carbon composites that are superior supercapacitor electrode materials. A supercapacitor can make use of this material in one or both of the electrodes. These exfoliated graphite-based composites exhibit great capacitance and electrical conductivity. Other desirable features of these composites include chemical stability and low mass density. They are also of lower costs compared with carbon nano-tube based materials. They can be mass-produced cost-effectively.

We claim:

1. A composite composition for use in an electrode for electrochemical capacitors, said composition comprising:
   a) an electrochemically active material; and
   b) exfoliated graphite flakes that are substantially interconnected to form a porous, conductive graphite network comprising pores, wherein at least a portion of said active material resides in a pore of said network and wherein said graphite network has a specific surface area greater than about 200 $m^2$/gm.

2. The composite composition as defined in claim 1 wherein said composite composition has a specific surface area greater than about 500 $m^2$/gm.

3. The composite composition as defined in claim 1 wherein said composite composition has a specific surface area greater than about 1,000 $m^2$/gm.

4. The composite composition as defined in claim 1 wherein said composite composition has a specific surface area greater than about 2,000 $m^2$/gm.

5. The composite composition as defined in claim 1 wherein said graphite flakes have an average thickness thinner than 10 nm.

6. The composite composition as defined in claim 1 wherein said graphite flakes have an average thickness thinner than 1.7 nm or, on an average, have no greater than 5 graphene layers.

7. The composite composition as defined in claim 1 wherein the electrochemically active material is selected from the group consisting of activated carbon, carbon aerogels, polymeric carbons, carbon foams derived from polymers, oxides, hydrous oxides, carbides, nitrides, conducting polymers, and combinations thereof.

8. The composite composition as defined in claim 7 wherein the oxides and hydrous oxides are selected from the group consisting of $RuO_2$, $IrO_2$, NiO, $MnO_2$, $VO_x$, $PbO_2$ and $Ag_2O$.

9. The composite composition as defined in claim 7 wherein the carbides and nitrides are selected from the group consisting of $MoC_x$, $Mo_2N$, $WC_x$, and $WN_x$.

10. The composite composition as defined in claim 7 wherein the conducting polymers are selected from the group consisting of polyaniline, polypyrrole, polythiophene, and their derivatives.

11. The composite composition as defined in claim 1 wherein said graphite network is substantially free of micropores.

12. The composite composition as defined in claim 1 wherein said pores contain a pyrolyzed carbonaceous polymer therein.

13. The composite composition as defined in claim 12 wherein said polymer is selected from the group consisting of phenol-formaldehyde, polyacrylonitrile, styrene DVB, cellulosic polymers, and epoxy resins.

14. The composite composition as defined in claim 1 wherein said electrochemically active material comprises an activated carbon and/or a surface functional group.

15. The composite composition as defined in claim 1 wherein said active material is functionalized with one or more functional groups selected from the group consisting of quinone, hydroquinone, quaternized aromatic amines, mercaptans, and disulfides.

16. An electrochemical capacitor, comprising:
   (A) first and second composite electrodes, each comprising a composite composition of claim 1; and
   (B) an electrode separator disposed between said first and second electrodes, the electrode separator comprising an electrically nonconductive and ionically conductive material.

17. The electrochemical capacitor of claim 16, wherein the electrochemically active material of the first or second composite electrodes is activated and/or functionalized.

18. The electrochemical capacitor of claim 16, wherein said first or second composite electrode has a surface area greater than about 500 $m^2$/gm.

19. The electrochemical capacitor of claim 16, wherein said first or second composite electrode has a surface area greater than about 1,000 $m^2$/gm.

20. The electrochemical capacitor of claim 16, wherein said first or second composite electrode has a surface area greater than about 2,000 $m^2$/gm.

21. The electrochemical capacitor of claim 16, wherein said graphite flakes have an average thickness thinner than 10 nm.

22. The electrochemical capacitor of claim 16, wherein said graphite flakes have an average thickness thinner than 1.7 nm or, on an average, have no greater than 5 graphene layers.

23. The electrochemical capacitor of claim 16, wherein the electrochemically active material is selected from the group consisting of activated carbon, carbon aerogels, polymeric carbons, carbon foams derived from polymers, oxides, hydrous oxides, carbides, nitrides, conducting polymers, and combinations thereof.

24. The electrochemical capacitor of claim 23, wherein the oxides and hydrous oxides are selected from the group consisting of $RuO_2$, $IrO_2$, NiO, $MnO_2$, $VO_x$, $PbO_2$ and $Ag_2O$.

25. The electrochemical capacitor of claim 23, wherein the carbides and nitrides are selected from the group consisting of $MoC_x$, $Mo_2N$, $WC_x$, and $WN_x$.

26. The electrochemical capacitor of claim 23, wherein the conducting polymers are selected from the group consisting of polyaniline, polypyrrole, polythiophene, and their derivatives.

27. The electrochemical capacitor of claim 16, wherein said pores contain a pyrolyzed carbonaceous polymer therein.

28. The electrochemical capacitor of claim 16, wherein said polymer is selected from the group consisting of phenol-formaldehyde, polyacrylonitrile, styrene DVB, cellulosic polymers, and epoxy resins.

29. The composite composition of claim 1, wherein said exfoliated graphite is derived from a laminar graphite material selected from natural flake graphite, spheroidal graphite, synthetic graphite, highly oriented pyrolytic graphite, meso-carbon micro-bead, carbon/graphite fiber, carbon/graphite whisker, carbon/graphite nano-fiber, or carbon nano-tube.

30. The electrochemical capacitor of claim 16, wherein said exfoliated graphite is derived from a laminar graphite material selected from natural flake graphite, spheroidal graphite, synthetic graphite, highly oriented pyrolytic graphite, meso-carbon micro-bead, carbon/graphite fiber, carbon/graphite whisker, carbon/graphite nano-fiber, or carbon nano-tube.

31. An electrochemical capacitor comprising a composite electrode, said composite electrode comprising (a) an electrochemically active material; and (b) exfoliated graphite flakes that are substantially interconnected to form a porous, conductive graphite network comprising pores, wherein at least a portion of said active material resides in a pore of said network and wherein said graphite network has a specific surface area greater than about 200 m$^2$/gm.

32. The electrochemical capacitor of claim 31, wherein said exfoliated graphite is derived from a laminar graphite material selected from natural flake graphite, spheroidal graphite, synthetic graphite, highly oriented pyrolytic graphite, meso-carbon micro-bead, carbon/graphite fiber, carbon/graphite whisker, carbon/graphite nano-fiber, or carbon nano-tube.

* * * * *